US006184624B1

(12) United States Patent
Inouchi

(10) Patent No.: US 6,184,624 B1
(45) Date of Patent: Feb. 6, 2001

(54) ION SOURCE

(75) Inventor: Yutaka Inouchi, Kyoto (JP)

(73) Assignee: Nissin Electric Co., Ltd., Kyoto (JP)

(*) Notice: Under 35 U.S.C. 154(b), the term of this patent shall be extended for 0 days.

(21) Appl. No.: 09/318,829

(22) Filed: May 26, 1999

(30) Foreign Application Priority Data

May 27, 1998 (JP) ........................................ 10-144947

(51) Int. Cl.[7] ........................ G01J 7/24; G05B 31/26

(52) U.S. Cl. ........................ 315/111.81; 315/111.21; 118/723 MR; 118/723 MA; 250/423 R; 313/231.31

(58) Field of Search .................. 315/111.81, 111.21; 250/492.21, 423 R; 118/723 MR, 723 MA; 313/231.31; 156/345

(56) References Cited

U.S. PATENT DOCUMENTS 5,925,886 * 7/1999 Seki et al. ..................... 315/111.81

FOREIGN PATENT DOCUMENTS 5-57798 3/1993 (JP) .
6-168685 6/1994 (JP) .

* cited by examiner

*Primary Examiner*—Michael B Shingleton
(74) *Attorney, Agent, or Firm*—Finnegan, Henderson, Farabow, Garrett & Dunner, L.L.P.

(57) ABSTRACT

A first coil is provided at a position near the start terminal (closer to the window) of plasma chamber. A second coil is provided at a position near the end terminal thereof (plasma electrode). To adjust an ion beam current, a constant current, which is capable of developing a magnetic field greater than a resonance magnetic field, is fed to the first coil, and a second coil current is varied within a range within which it develops a magnetic field less than the resonance magnetic field.

7 Claims, 5 Drawing Sheets

ION SOURCE

BACKGROUND OF THE INVENTION

1. Field of the Invention

The present invention relates to a microwave ion source or an ECR ion source which can vary an ion beam current Ib over broad range. More particularly, the invention relates to a microwave ion source or an ECR ion source which may be used for an ion implanter requiring a broad dynamic range for an ion beam current.

2. Description of the Related Art

In a conventional microwave ion source or ECR ion source, a microwave is used for plasma exciting source. This type of ion source does not use a filament, which is essential to the ion source of the Freeman type or Bernas type. The microwave ion source (ECR ion source) has advantages of long lifetime and stable operation because of no filament. The microwave ion source is constructed with a magnetron, a wave-guide, plasma chamber, and an extraction electrode system. In the ion source, a source gas is converted into plasma by use of the microwave, and it is extracted in the form of an ion beam.

In the ECR ion source, a microwave of 2.45 GHz is used, a resonance magnetic field at 875 Gauss is generated by applying a vertical magnetic field caused by a coil, and the plasma generation efficiency is increased through the resonance absorption.

The Freeman type or Bernas type ion source, which uses the filament, has also advantages. A first advantage is that the dynamic range of the ion beam is wide. The ion beam current can be varied over a broad range from 1 $\mu$m to several mA by varying the filament current or the arc voltage. In this respect, the Freeman or Bernas type ion source is superior to the microwave ion source or the ECR ion source which uses a microwave for the exciting energy.

The microwave ion source or the ECR ion source is disadvantageous in that the dynamic range for the extraction beam is narrow (dynamic range: a range over which the ion beam current is varied). Because of the disadvantage of the narrow dynamic range, the microwave ion source is not applied to the ion implanter of the medium current. This is because the medium-current ion implanter requires a broad dynamic range.

In the microwave ion source or the ECR ion source, the microwave power is controlled to vary the extraction beam current. The microwave output power of the magnetron is varied. Generally, the range of the magnetron over which the output power of the magnetron is variable is narrow. The output power of the magnetron is varied by an electric power input thereto. If the input electric power is excessively decreased, the operation of the magnetron is instable. In an extreme case, it will stop its operation. For this reason, it is impossible to greatly vary the input power to the magnetron. A variation of the ion beam current caused by varying the output power of the magnetron is within at most ten times. It is almost possible to realize the dynamic range only from approximately 1 to 10 times.

The ion source has been used for various purposes. In some examples, the required dynamic range is not so wide. In case where the ion source is used for impurity doping in the semiconductor manufacturing field, it is required to vary a doping density over a broad range from 1 to $10^3$ times. The microwave ion source or the ECR ion source is unsatisfactorily operable for such a case. The power variable range of the magnetron is only within the range of 1 to 10 times. The approach dependent only on the magnetron function fails to secure a broad beam current variation.

In the case of the ECR ion source, the following approach is possible: the ion beam current Ib is varied by varying the coil current to develop the vertical magnetic field and then plasma density. When the current flowing through the coil disposed surrounding the plasma chamber is varied, the magnetic field is varied and the size of a resonance region is varied. Therefore, the plasma density is varied accompanying with this variation, and the ion beam current also varies.

The coil current adjustment of the coil for producing the resonance magnetic field is used for the ion beam control has never been used actually. The ion source is operated in a state that the coil current for causing the resonance magnetic field is set at a fixed value. The reason for this follows. If the vertical magnetic field (resonance magnetic field) is varied, the matching condition of the microwave with the plasma changes, and hence the plasma reflection increases. If the resonance magnetic field is varied, the ion beam nonlinearly varies, and the operation of the ion source is instable. In an extreme case, the plasma disappears. It is for this reason that the variation of the vertical magnetic field is not used for the ion beam adjustment.

Where the medium-current ion implanter is used, a dosage of ions should be varied over a broad range. For this reason, the microwave ion source or the ion source of this type cannot be applied to this ion implanter. There is a strong demand to use the microwave ion source or the ECR ion source, which are stable in operation, for the medium-current ion implanter. To realize this, it is required to vary the dynamic range for the ion beam current of the ion source over a broad range from 1 to $10^3$. The present invention has been made to realize such a broad dynamic range of the microwave ion source or the ECR ion source.

(1) Unexamined Japanese Patent Publication (kokai) No. Hei 6-168685

Unexamined Japanese Patent Publication (kokai) No. Hei. 6-168685, entitled "Electron Cyclotron Resonance Multiply-charged Ion Source", will be described as a conventional art, although it has an object different from that of the present invention, but it handles the same technique as of the invention in that two coils are used for the microwave ion source. The publication technique is presented for generating multiply-charged ions. Forming the multiply-charged ions is much more difficult than the singly-charged ions. Multiply-charged ions are not generated till plasma is excited at high temperature and high density. To this end, it is necessary to make the resonance active and to make a more accurate confinement of the plasma.

FIG. 3 is a diagram schematically showing a construction of a multiply-charged ion source. A vacuum chamber 30 is plasma chamber. Microwave 32 propagates from left to right in the drawing. First coil 33 is located on the front or left side the ion source. The first coil 33 is surrounded with an iron core 34. The first coil 33 generates a magnetic field B1 in front of the vacuum chamber 30. An intermediate iron core 35 surrounds the vacuum chamber 30. An intermediate coil 36 is wound on the intermediate iron core 35. A second coil 37 is located on the rear or right side of the vacuum chamber 30. The second coil 37 is surrounded with an iron core 38. Currents are fed to the second coil 37, the first coil 33, and the intermediate coil 36 in the same direction. Those three coils generate a vertical magnetic field. Magnetic lines of force 39, 40 and 42 are developed in the axial line. A magnetic resonance occurs at 875 Gauss to form resonance regions 43 and 44. The magnetic flux density B reaches 875 Gauss, and electrons furiously move to generate plasma.

FIG. 4 is a diagram showing a distribution of magnetic flux density in the axial direction. To depict the magnetic flux density distribution, current fed to a first coil 33 was substantially equal in value to the current fed to a second coil 37. In order to generate multiply-charged ions while causing a magnetic resonance in a range as broad as possible, the magnetic flux density was set at 875 Gauss at both max points B1 and B2. In FIG. 4, points encircled are resonance points. A mirror magnetic field was formed at the mid position between the resonance points. To further enhance the control performance, the intermediate coil 36 and the intermediate iron core 35 are provided to superimpose the magnetic field developed by the intermediate coil on the magnetic field by the first and second coils. The superimposing of the magnetic fields increases a magnetic flux density at the intermediate point as indicated by a dotted line in FIG. 4. And the resonance points shift from those when no superimposing of the magnetic fields is performed. The resonance regions increase; plasma temperature rises; an electron collision probability increases; singly-charged ions are ionized into doubly-valent ions; and doubly-valent ions are further ionized into triply-charged ions. The object of the invention of the publication is to generate multiply-charged ions. To achieve this, the intermediate coil 36 and the intermediate iron core 35 are additionally used to increase the magnetic flux density in the intermediate portion. Presence of the intermediate iron core 35 creates a close magnetic coupling of the first and second coils. The current fed to the first coil is set at a fixed value, and the current fed to the second coil is also set at a fixed value. A control parameter is the current fed to the intermediate coil 36. The resonance regions are increased, by varying the control parameter, to increase the plasma temperature and to generate multiply-charged ions. Thus, the object of the invention of the publication is to generate the multiply-charged ions, while the object of the present invention is to control the ion beam current Ib.

(2) Unexamined Japanese Patent Publication (kokai) No. Hei.5-57798

Unexamined Japanese Patent Publication (kokai) No. Hei. 5-57798, entitled "Magnetic Field Generator", has an object, which is quite different from the object of the present invention. However, the invention of the publication and the present invention are common in that two coils are used for the microwave plasma generator. This will be described hereunder. The object of the publication invention is to generate a high temperature/density plasma, and not to control the ion beam current.

FIG. 5 is a schematic illustration of a technique which is believed to be a conventional art to the present invention. Microwave is introduced into a chamber 50, from a waveguide 51. The chamber 50, unique in form, is provided with pocket chambers 52 and 53 on both sides. Those pocket chambers are wound by air-core coils 54 and 55, respectively. The inventor of the publication considers that the use of those coils is unsatisfactory in achieving the invention object, and proposes a scheme illustrated in FIG. 6. In the illustrated scheme, coils 56 and 58 are additionally used. With those additional coils, a magnetic field is also applied to the central portion or its vicinity of the chamber 50. In the publication, the inventor describes that the use of those additional coils realizes a minimum magnetic field allocation, and that it increases a magnetic field range of the ECR heating condition. Superimposing a local magnetic field developed by the coils 56 and 58 on the mirror magnetic allocation broadens the magnetic resonance region. The object of the publication invention is to generate a high temperature/density plasma. The air-core coils determines the whole magnetic field allocation of the plasma generator. Therefore, adjustment of a local magnetic field fails to adjust the plasma density over a great range. Thus, it is clear that the publication technique is not concerned with the ion beam current control handled in the present invention.

Consequently, it can be considered that both the publication inventions are common to the present invention in that two coils are used, but are quite different from the present invention in object. Therefore, it is believed that no consideration of the two publications is required in studying the present invention. The magnetron power adjustment is rather suitable for the conventional art of the ion beam current control of the present invention.

SUMMARY OF THE INVENTION

It is an object of the present invention is to provide a microwave ion source or ECR ion source in which the dynamic range for the ion beam current is broad (e.g., 1 to $10^3$), the ion beam current may be varied over a broad range by use of one control parameter, the ion beam current monotonously varies with respect to a control parameter, and even if the extraction current (ion beam current) is varied, the matching condition of the microwave with the plasma is little lost.

A microwave ion source of the invention includes a first coil located at a position near the start terminal (closer to the window) of plasma chamber and a second coil located at a position near the end terminal thereof (plasma electrode). The magnetic field centers of the two coils are sufficiently separated from each other. The magnetic field has a local minimum at the mid or intermediate position between the magnetic field centers of the two coils. A first magnetic field B1 caused by the first coil is set at a fixed value containing the resonance magnetic field. A second magnetic field B2 by the second coil is smaller than the resonance magnetic flux density Br and variable: $B1 \geqq Br > B2$, B1=fixed value, and B2 is variable.

The magnetic flux density B is not a variable that is directly controllable. B is determined by current I. The control performance will be described using the first coil current I1. The second magnetic field B2 is determined by the second coil current I2. Therefore, the first coil current I1 is larger than the current Ir causing the resonance magnetic field and is fixed at a constant value. The second coil current I2 is smaller than the current Ir causing the resonance magnetic field and a control parameter. Hence, $I1 \geqq Ir > I2$. Since the first coil current I1 is equal to or more than a value of the current Ir corresponding to the resonance magnetic field, the resonance absorption of the microwave is active and a highly dense plasma is generated in the vicinity of the window (start terminal of the plasma chamber). Since the second coil current I2 is smaller in value than the current Ir corresponding to the resonance magnetic field, no resonance absorption of the microwave occurs in the vicinity of the plasma electrode (outlet of the plasma chamber). If the second coil current I2 is increased, the plasma density is increased in its region and the ion beam current Ib also increases. If the second coil current I2 is decreased, the plasma density is decreased in its region, and the ion beam current Ib also decreases. The second coil current I2 has a monotonous variation with respect to the ion beam current Ib.

By varying the second coil current I2, the ion beam current Ib varies over a range from 1 to $10^3$. The fact shows that the invention succeeds in achieving a broad dynamic range. Specifically, the ion beam current Ib is variable over a range from several $\mu$A to several mA. When the invention is applied to the ion implanter, a dosage of ions may be varied over a wide range from 1 to $10^3$.

Since the magnetron power is fixed, its operation is stable. The first coil current I1 is constant, and hence the plasma generation rate is stable in the vicinity of the window.

PREFERRED EMBODIMENTS OF THE INVENTION

Figure 1:
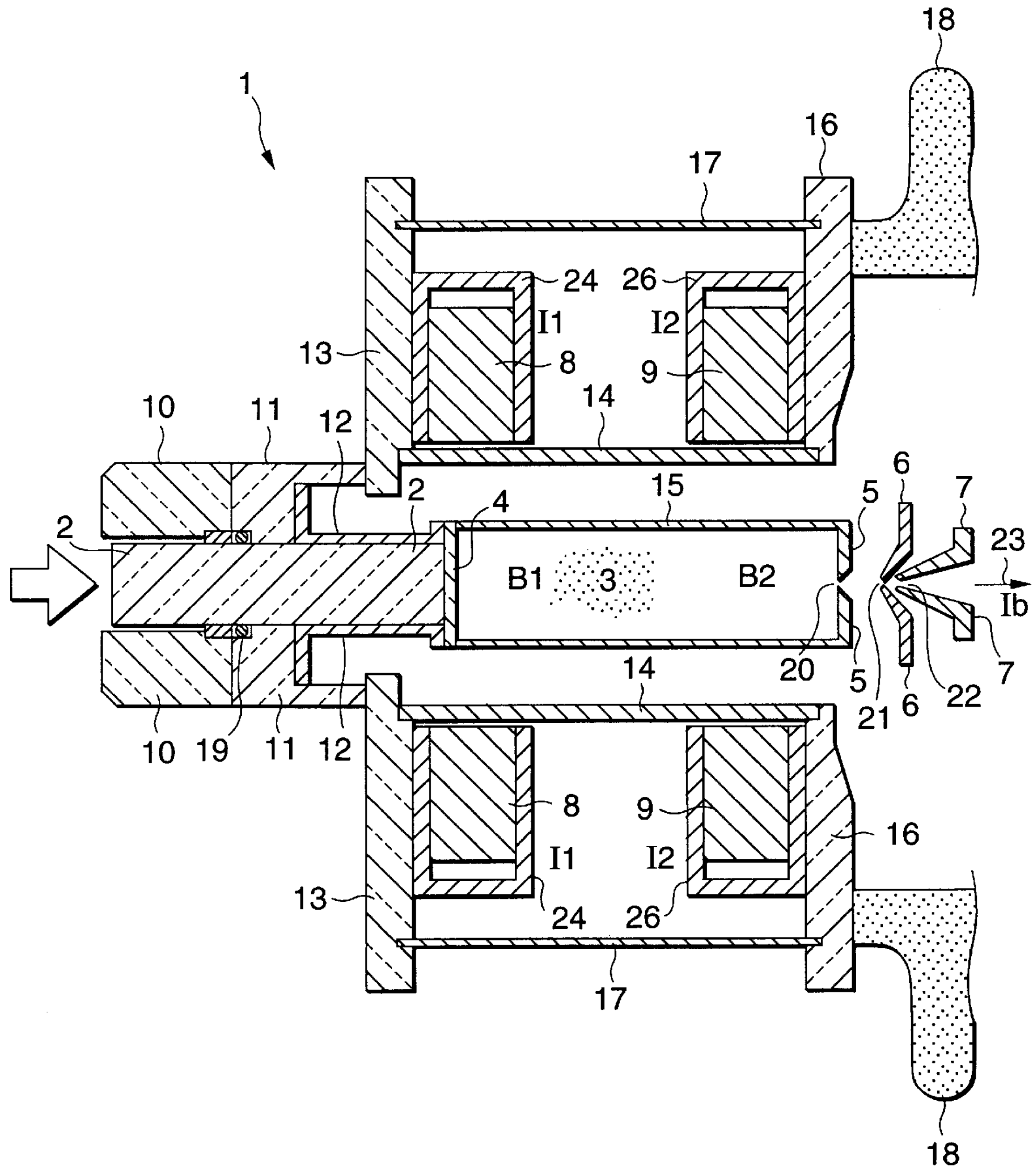
FIG. 1 is a cross sectional view showing a microwave ion source constructed according to the present invention.

Reference is made to FIG. 1, there is shown a microwave ion source which is the preferred embodiment of the present invention. A microwave ion source 1 includes an alumina waveguide 2 for guiding a microwave into the ion source, and plasma chamber 3 providing a space for generating plasma. As shown, the alumina waveguide 2 is disposed followed by plasma chamber 3. The alumina waveguide 2, which follows a magnetron (not shown), has the diameter of about 3 cm in the embodiment. Accordingly, the diameter of the plasma chamber 3 is also small. If a cavity (hollow) type waveguide is used, the microwave cannot enter into the plasma chamber, through a narrow inlet. To avoid this, a solid type waveguide is used in the embodiment. A dielectric constant of the solid type waveguide is large, 10, and therefore, the diameter of the microwave is reduced greatly to ⅓, to allow a large amount of microwave power to pass therethrough. A microwave window 4 is a dielectric window. The microwave window 4 is provided at the start terminal of the plasma chamber 3, elongated in shape, while plasma electrode 5 is provided at the end terminal of the plasma chamber 3. A suppress electrode 6 and a ground electrode 7 are provided outside of the plasma electrode 5. The plasma electrode 5 and the plasma chamber 3 are biased to at high potential. A negative voltage is applied to the reduction electrode 6. This is for preventing the reverse flow of electrons. The ground electrode 7 is grounded.

A first coil 8 is disposed surrounding the microwave window 4 of the microwave ion source 1. A conductive wire is wound surrounding the plasma chamber. A magnetic field is developed in the longitudinal axis of the plasma chamber, and localized in a region near the microwave window 4. A density of the magnetic flux developed is denoted as B1. A current fed to the first coil is denoted as I1. A second coil 9 is located near and around the plasma electrode 5. The second coil 9 consists of a conductive wire wound surrounding the plasma chamber. A magnetic field developed by the second coil 9 is localized to near the plasma electrode 5. A current flowing into the second coil 9 is denoted as I2 and a magnetic field developed by the currentI2 is denoted as B2.

A ring 10 is put on a part of the alumina waveguide 2, located closer to the magnetron. Further, a waveguide holder 11 is put contiguous to the ring 10. Its interior is in vacuum, while its outside is at atmospheric pressure. An O-ring 19 intervenes between it and the alumina waveguide 2 for hermetic sealing purpose. A cylindrical plasma-chamber holder tube 12 is located following the waveguide holder 11. The plasma-chamber holder tube 12 holds the plasma chamber 3 with the aid of the waveguide holder 11. A waveguide holder 11 is fitted to a disc-like outer wall 13. An inner cylinder 14 couples the outer wall 13 with a parting wall 16. The interior of the inner cylinder 14 is in vacuum, while the outside thereof is at atmospheric pressure. A wall 15 defining the plasma chamber 3 is disposed coaxial with the inner cylinder 14. The parting wall 16 is disposed followed by an insulating socket 18. The insulating socket 18, the parting wall 16, the inner cylinder 14, the outer wall 13, the waveguide holder 11, and the O-ring 19 cooperate to maintain a vacuum state of the interior of the ion source.

The first coil 8 develops a vertical magnetic field B1 in the plasma chamber 3 since it surrounds the plasma chamber 3. The magnetic field B1, formed near to the microwave window 4 and at the start terminal of the plasma chamber, causes a cyclotron of electrons to resonance-absorb the microwave. An electron cyclotron angular frequency ω is given by ω=qB/m (where m=electron mass, q=charge, B=magnetic flux density). The resonance condition is 2πf=ω where f is the frequency of the microwave. When f=2.45 GHz, the resonance magnetic flux density Br=875 Gauss. The magnetic flux density B1 by the first coil is set at its peak value larger than the resonance magnetic flux density Br. B indicates a magnetic flux density, but is referred to simply as a magnetic field frequently.

The magnet field caused by the first coil will be referred to as a first magnetic field B1. The first magnetic field B1 is spatially distributed. The first coil 8 has a ferromagnetic yoke 24, shaped like U in cross section, not air-core. The yoke 24 surrounds both sides and the rear side, and is opened to the front (inner side).

The yoke 24 shields the magnetic field extending to the rear side. This is because all the magnetic lines of force going to the rear side emanate from the yoke. The magnetic lines of force emanate from the end face of the yoke 24 that is directed to the inner side, and enters the end face of the yoke, which is opposite to the former. The coil magnetic field is confined within the opening of the yoke to form a resonance magnetic field. Electrons actively absorb the microwave. Electron motion is furious in the resonance region. Plasma generation is performed actively. The first magnetic field B1 provides such a spatial distribution. The first magnetic field B1 is substantially fixed. To this end, the first coil current I1 is set at a fixed value.

The second coil 9 is located near the end terminal of the plasma chamber or the plasma electrode 5. The rear side and both sides of the second coil 9 are surrounded by a ferromagnetic yoke 26. The first and second coils 8 and 9 are provided at the front and rear sides of the plasma chamber. The structure of the plasma chamber seems to be symmetrical with respect to its center. Actually, it is not symmetrical. The second magnetic field B2 is smaller in intensity than the resonance magnetic flux density Br, and is variable. The second magnetic field B2 is a continuously variable control parameter. For this reason, the second coil current I2 is variable. The second magnetic field B2 does not cause resonance absorption of microwave by electrons.

Figure 2:
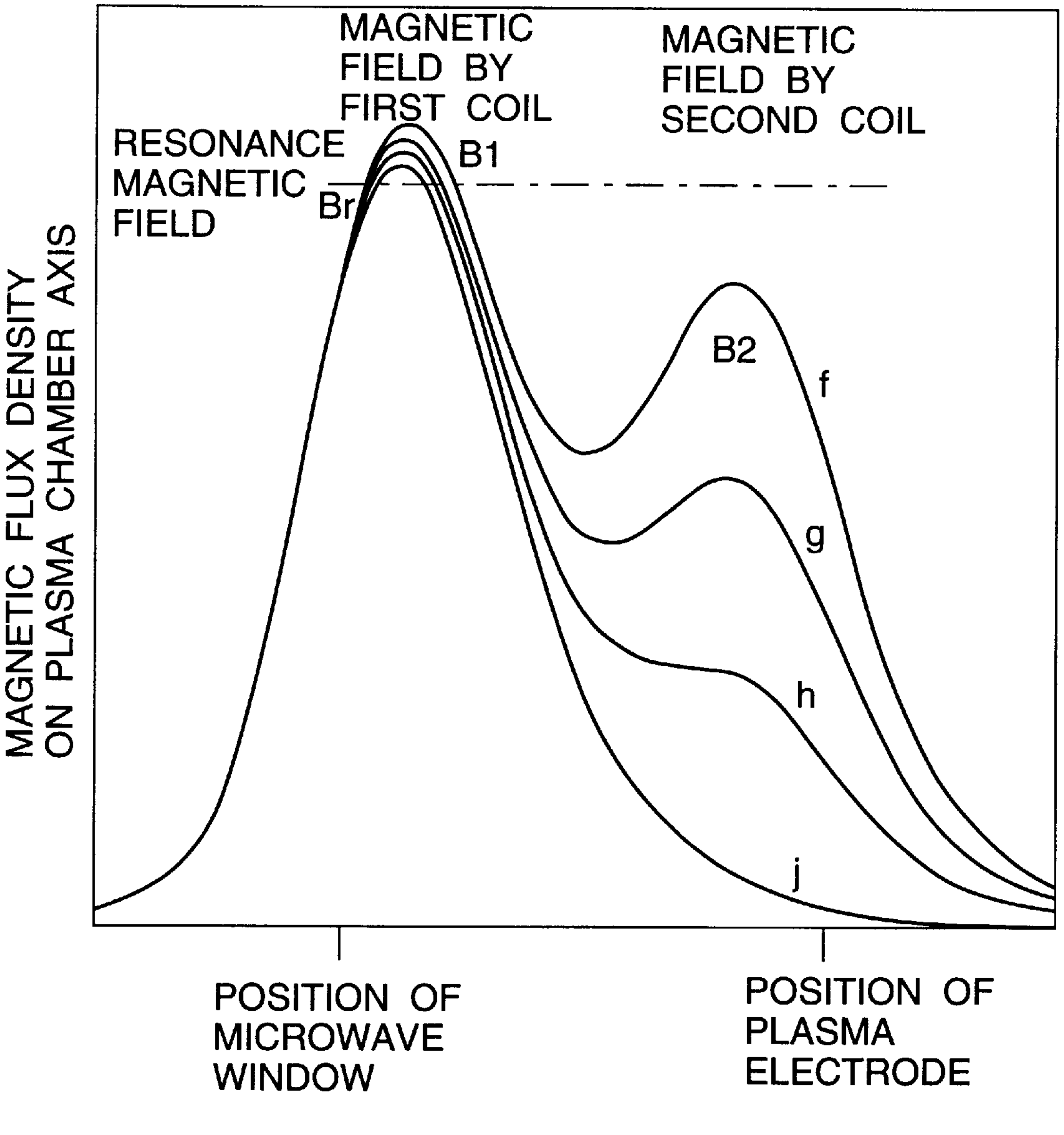
FIG. 2 is a graph showing a variation of a magnetic flux distributed along the longitudinal axis of plasma chamber when a second coil current I2 is varied in the FIG. 1 ion source.
Figure 3:
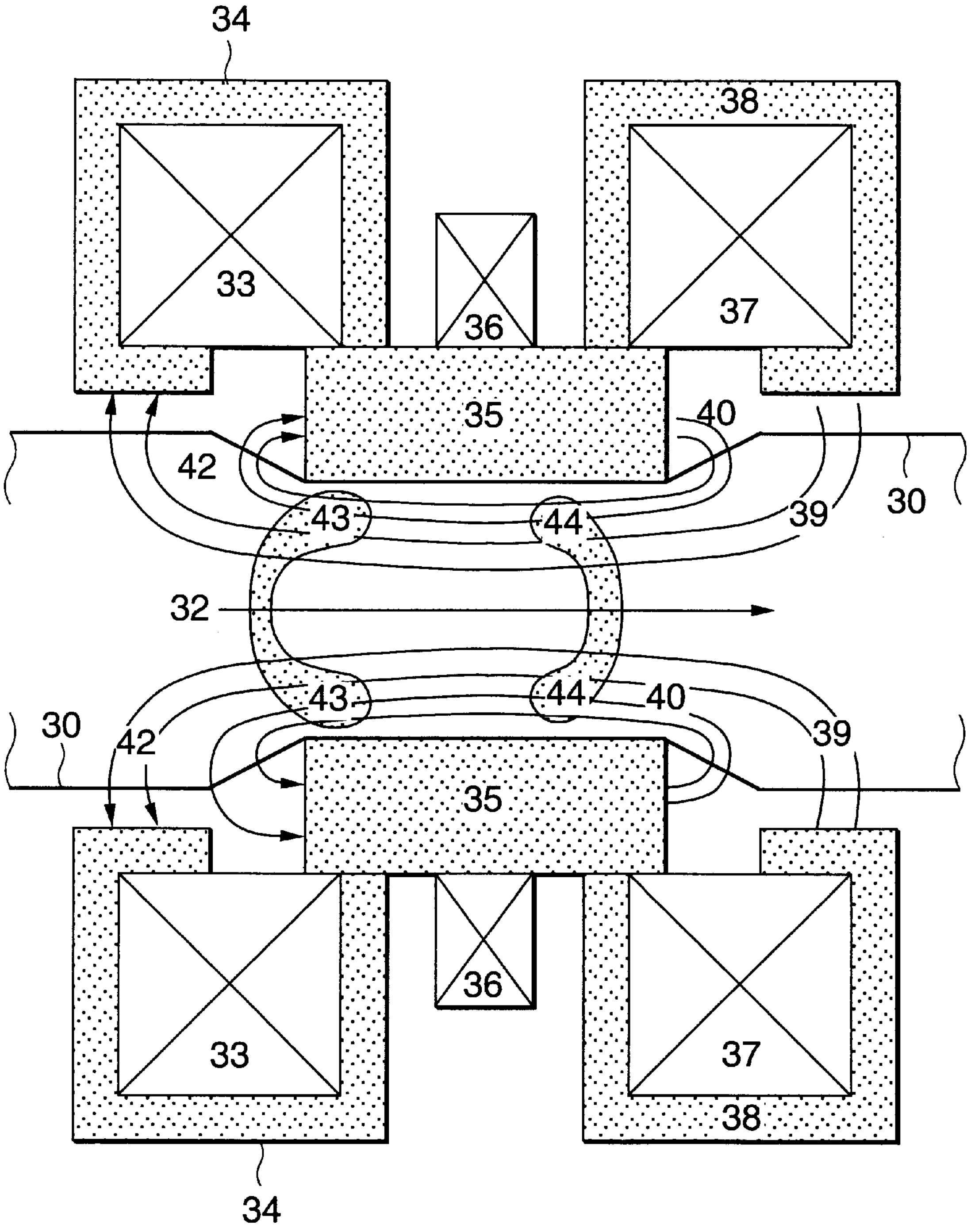
FIG. 3 is a sectional view showing a scheme of an electron cyclotron resonance multiply-charged ion source (Unexamined Japanese Patent Publication (kokai) No. Hei. 6-168685)
Figure 4:
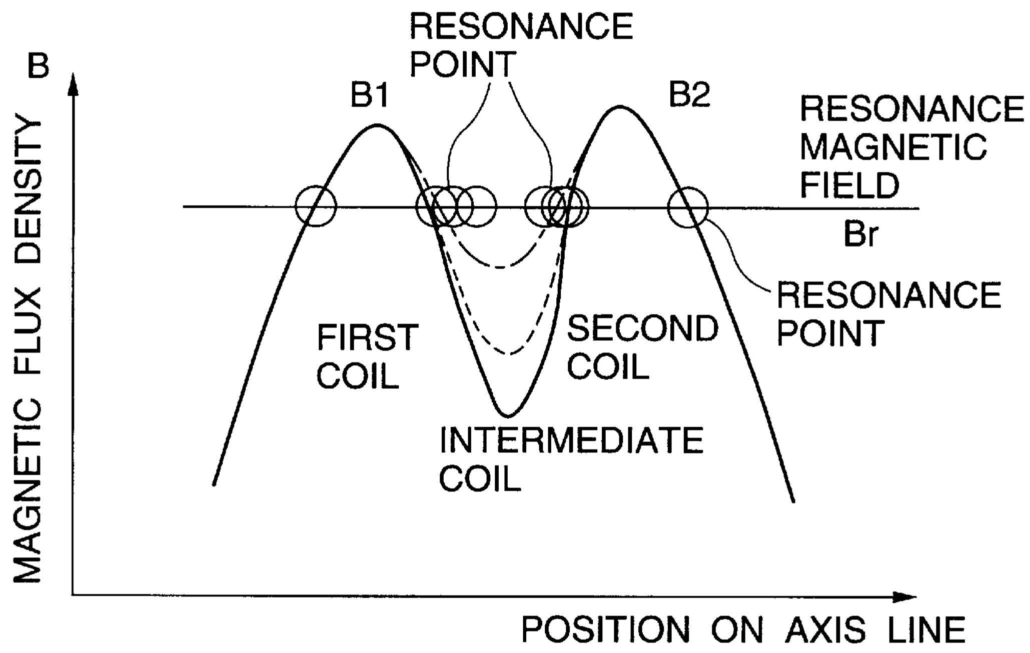
FIG. 4 is a graph showing a variation of a magnetic flux distributed along the longitudinal axis of the FIG. 3 ion source.
Figure 5:
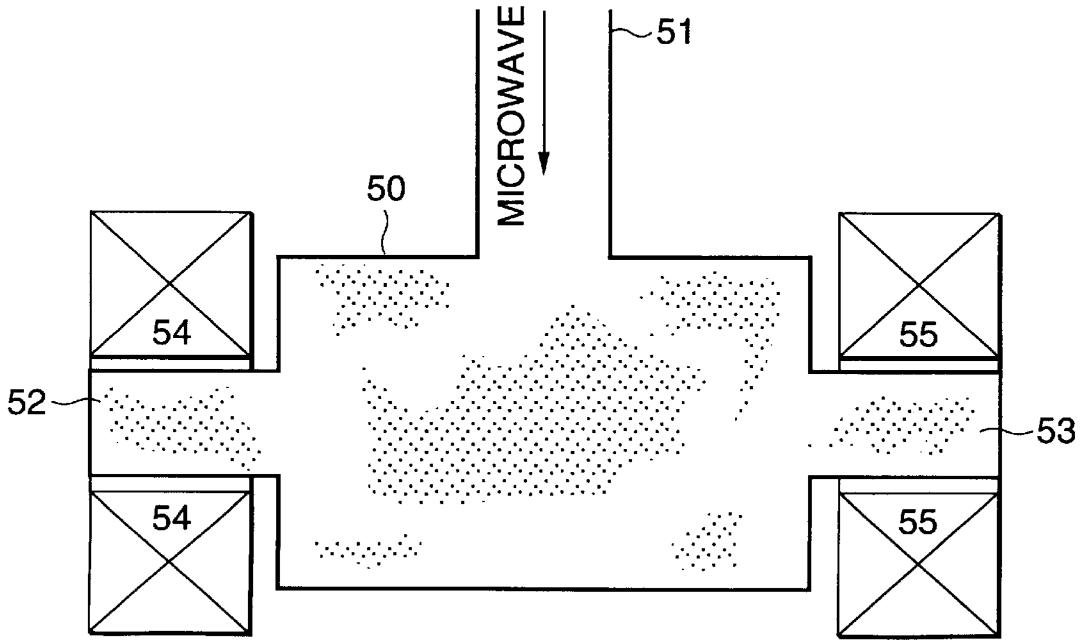
FIG. 5 is a sectional view showing a scheme of an ECR plasma generator discussed in the conventional art discussion in Unexamined Japanese Patent Publication (kokai) No. Hei. 5-57798.
Figure 6:
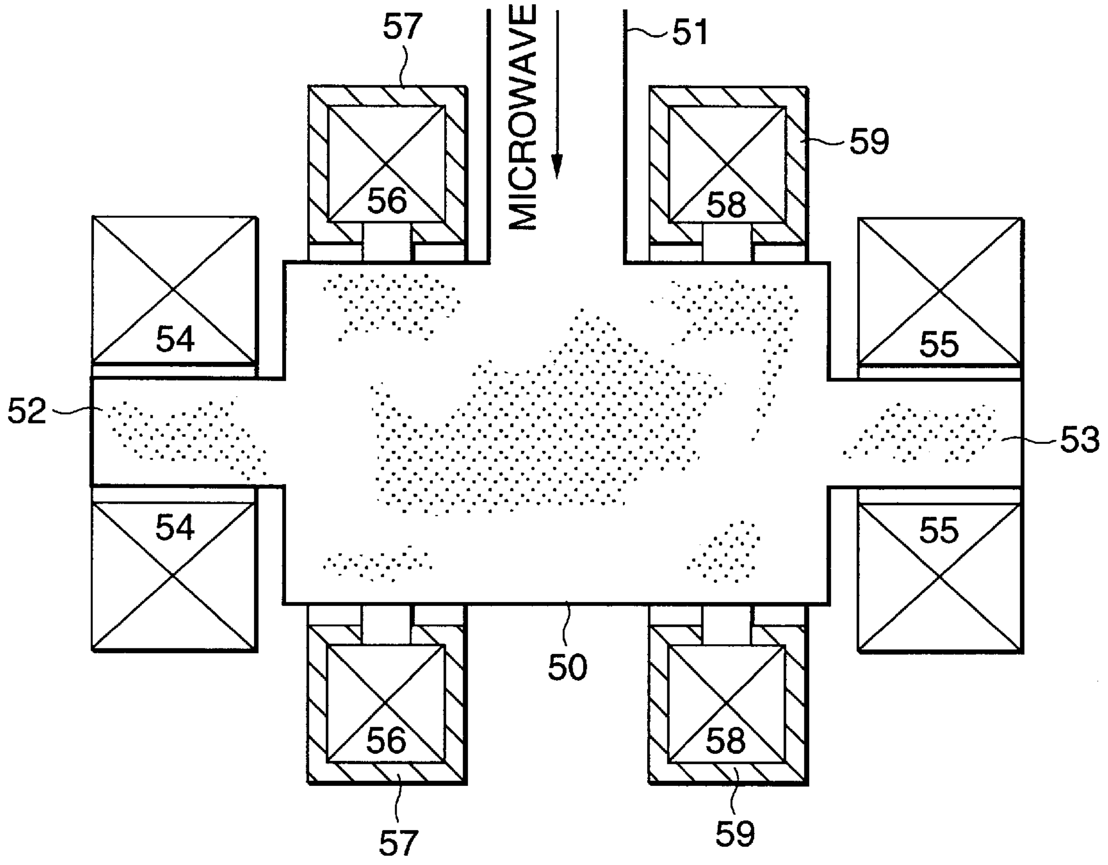
FIG. 6 is a sectional view showing a scheme of an ECR plasma generator proposed Unexamined Japanese Patent Publication (kokai) No. Hei. 5-57798.

FIG. 2 shows variations of the magnetic flux density B(0, 0, z) distributed along the longitudinal axis of the plasma chamber. A peak of the first magnetic field B1 variation, located to the left side, is a peak of it in the vicinity of the microwave window 4. This consists mainly of the first magnetic field B1 caused by the first coil 8. A peak located to the right side consists mainly of the second magnetic field B2 by the second coil.

The following three points should be noted as control conditions.

(1) The peak of the first magnetic field B1 near the microwave window 4 (start terminal of the plasma chamber) is larger in value than the resonance magnetic flux density Br: B1max≧Br where B1max is the maximum value of the first magnetic field B1. Therefore, a resonance region of B1=Br occurs in the vicinity of the window.

(2) In the vicinity of the plasma electrode 5 (end terminal of the plasma chamber), the peak value is smaller than the resonance magnetic flux density Br:B2max<Br. Therefore, the resonance magnetic field is not developed. The magnetic field in this region is substantially caused by the second magnetic field B2.

(3) The magnetic field in the vicinity of the plasma electrode varies. If the second coil current I2 is varied, the second magnetic field B2 varies. The magnetic field by the second coil a little extends to a region in the vicinity of the window. Therefore, the magnetic flux density B is little varied at the position of the window; the variation quantity is small.

As described above, three notable control conditions are present. The first and second coils are asymmetrical in two meanings: I1 is a fixed value, and I2 is a free variable; and I1 is large and B1>Br, and I2 is small and B2<Br. Thus, two symmetries are contained in those coils. Why I2 is a free variable will be described hereunder. This is essential to the present invention.

The ion source is a small microwave ion source. In the ion source, the microwave is compressed by the solid type alumina waveguide 2 and then guided to the plasma chamber. Therefore, a relatively large microwave power is effectively input to the plasma chamber. A cyclotron of electrons takes place in the region near to the window because of the strong first magnetic field B1. The microwave is actively resonance absorbed to increase plasma density. The second magnetic field B2 by the second coil current I2 is present in the vicinity of the plasma electrode. Where the B2 is small (j), plasma density is low in the region in the vicinity of the plasma electrode. Therefore, the ion beam current Ib is small. When B2 is increased to "h", the plasma density increases in the vicinity of the plasma electrode. Then, the ion beam current Ib increases.

When B2 is further increased to "g", the plasma density further increases in the vicinity of the plasma electrode. Then, the ion beam current Ib further increases. When B2 is additionally increased to "g", the plasma density additionally increases in the vicinity of the plasma electrode. Then, the ion beam current Ib extracted from the plasma electrode additionally increases.

B2 is always smaller than the resonance magnetic flux density Br. If B2 is equal to or larger than Br, a resonance region of B2=Br appears and a resonance occurs. Then, the ion beam current Ib is increased in a discontinuous manner; viz., a continuity of the current variation is lost. When B2 is decreased and an instant that it crosses Br (curve), Ib decreases in a discontinuous manner. Such a discontinuity of the current variation is undesired. It is for this reason that the condition B2<Br is required.

Thus, the extracted ion beam current Ib is varied by varying the second magnetic field B2 in the vicinity of the plasma electrode. This variation is a desirable variation. When the second magnetic field B2 is varied in the order of j→h→g→f, the ion beam current Ib monotonously varies. B2 is a one-valued, monotonous increasing function of Ib. Therefore, Ib can accurately be controlled by use of B2.

What is desirable is additionally present. It is that Ib is variable over a broad range from 1 to $10^3$. The dynamic range for the ion beam current Ib is broadened to three-digit order. The ion beam current may be varied over the range from 1 to $10^3$ by the presence of the second magnetic field B2 even if the magnetron power is fixed and the first coil current I1 is set to a fixed value. The broad dynamic range of several μA to several mA is secured.

The ion source according to the present invention is applied to an ion injection device. By using the ion injection device, ions are irradiated to a material or a substrate made of a semiconductor, a metal, an organic material, an inorganic material, a glass or the like in vacuum so as to work it and apply a function thereto.

The present invention has the following beneficial effects. The dynamic range for the ion beam current Ib is broadened to a range from 1 to $10^3$ in the microwave ion source and the ECR ion source. There are no conventional techniques to achieve such a broad dynamic range, so far as we know. The ion source of the invention, which has such a broad dynamic range, is applicable to the ion implanter for the impurity doping in the semiconductor field. In the medium-current ion implanter, a dosage of ions is varied over a wide range. For this reason, the Freeman or Bernas type ion source is used unexceptionally. The present invention succeeds in enabling the microwave ion source or the ECR ion source to be applied to the medium-current ion implanter. The ion source of the invention provides a medium-current ion source while keeping the advantages of the ion source using microwave, i.e., long lifetime and stable operation.

The magnetron may oscillate under optimum conditions without varying the magnetron power. Therefore, the magnetron operation is more stable. It is better that the magnetron is operated under fixed conditions. If the magnetron power is varied, poor reproduction is produced. No variation of the magnetron power is very useful for securing a stable operation of the ion source.

The control parameter is only the second coil current I2. Therefore, the ion beam current Ib can be controlled by varying only the second coil current I2. Further, the second coil current I2 is simply changed to the ion beam current Ib. This indicates that the control of the ion beam current Ib is easy.

Further, a magnetic field in the vicinity of the window is little varied, so that the plasma generation is stable since its condition is not changed. The matching condition of the microwave with the plasma is little changed.

What is claimed is:

1. An ion source for an ion implanter comprising:

a magnetron for generating a microwave;

a waveguide for guiding the microwave;

plasma chamber that is vacuumed, for providing a space for generating plasma;

a microwave window for guiding the microwave into said plasma chamber while keeping a vacuum state;

plasma electrode, provided at an outlet of said plasma chamber, for extracting an ion beam from said plasma chamber;

an electrode system disposed following said plasma electrode;

a first coil for generating a fixed magnetic field larger than a resonance magnetic field in the vicinity of said microwave window, said first coil being disposed surrounding said plasma chamber and near said microwave window; and a second coil, located near said plasma electrode, for developing a variable magnetic field smaller than said resonance magnetic field in a region near said plasma electrode;

wherein an ion beam is varied by varying a second coil current of said second coil while keeping an magnetron output power at a fixed value.

2. The ion source according to claim 1, wherein a first coil current of said first coil is set at a fixed value.

3. The ion source according to claim 1, wherein said wave guide comprises a solid material.

4. The ion source according to claim 1, wherein said microwave window is a dielectric window.

5. A method of working a material by using an ion implanter comprising said ion source as claimed in claim 1, wherein ions are irradiated to said material in vacuum to work said material and apply a function thereto.

6. The method according to claim 5, wherein said material is at least one of a semiconductor, a metal, an organic material, an inorganic material, and glass.

7. The method according to claim 5, wherein said material is a substrate.

* * * * *

UNITED STATES PATENT AND TRADEMARK OFFICE

CERTIFICATE OF CORRECTION

PATENT NO. : 6,184,624 B1
DATED : February 6, 2001
INVENTOR(S) : Yutaka Inouchi

It is certified that error appears in the above-identified patent and that said Letters Patent is hereby corrected as shown below:

Column 9,
Line 18, after “ion beam” insert -- current --.
Line 19, “an magnetron” should read -- a magnetron --.

Signed and Sealed this

Third Day of December, 2002

JAMES E. ROGAN
*Director of the United States Patent and Trademark Office*